United States Patent [19]

Ruckwardt

[11] Patent Number: 5,316,245
[45] Date of Patent: May 31, 1994

[54] PLASTIC HOLDING ELEMENT

[75] Inventor: Hans-Werner Ruckwardt, Eisenberg, Fed. Rep. of Germany

[73] Assignee: TRW United Carr GmbH & Co., KG, Alsenborn, Fed. Rep. of Germany

[21] Appl. No.: 46,037

[22] Filed: Apr. 12, 1993

Related U.S. Application Data

[63] Continuation-in-part of Ser. No. 783,545, Oct. 25, 1991, abandoned.

[30] Foreign Application Priority Data

Apr. 22, 1992 [DE] Fed. Rep. of Germany ....... 4213231

[51] Int. Cl.⁵ ................................................ F16L 3/22
[52] U.S. Cl. ...................................... 248/68.1; 248/73; 248/74.2
[58] Field of Search .................... 248/68.1, 74.2, 71, 248/73; 174/135; 24/498; 411/41

[56] References Cited

U.S. PATENT DOCUMENTS

| | | | |
|---|---|---|---|
| 4,733,835 | 3/1988 | Schlanger | 411/41 X |
| 4,899,964 | 2/1990 | Sick | 24/459 X |
| 4,936,530 | 6/1990 | Wollar | 248/71 |
| 5,033,701 | 7/1991 | Kraus | 248/71 X |
| 5,039,040 | 8/1991 | Idjakiren | 248/73 |
| 5,113,717 | 5/1992 | Plamper | 248/68.1 |
| 5,161,759 | 11/1992 | Burns | 248/71 |
| 5,170,984 | 12/1992 | Ruckwardt | 248/74.2 |
| 5,184,794 | 2/1993 | Saito | 248/68.1 |
| 5,209,441 | 5/1993 | Satoh | 248/74.2 |

Primary Examiner—J. Franklin Foss
Attorney, Agent, or Firm—Fay, Sharpe, Beall, Minnich & McKee

[57] ABSTRACT

The subject invention relates to a holding element made of plastic, with a first part (2) formed of hard plastic and having a storage zone (5) for acceptance of at least one tube-shaped part. A second part (3) made of soft, attenuating material is embedded in the first part (2) and a third part (4), embedded in same via a traversing aperture (6) exhibiting a holding zone (7"). According to the invention, the holding zone (7") of the third part (4") may be designed as a peg (23), equipped with at least one profiling (22) positionable into the aperture of a support, or as an arrow base (40), or as a spreader rivet (50).

21 Claims, 2 Drawing Sheets

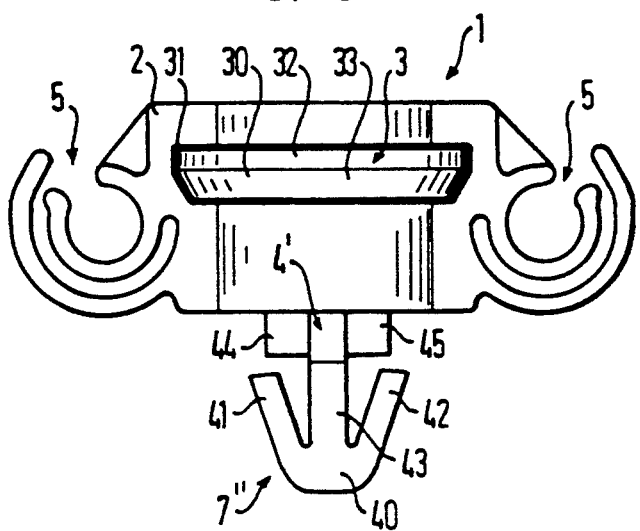
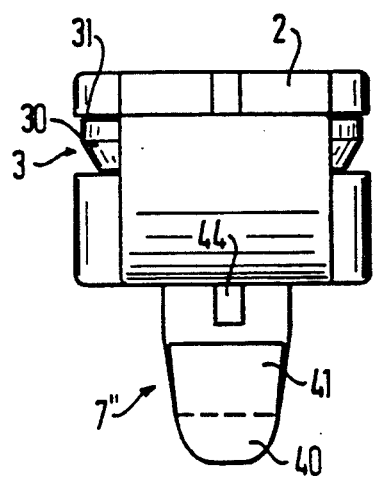
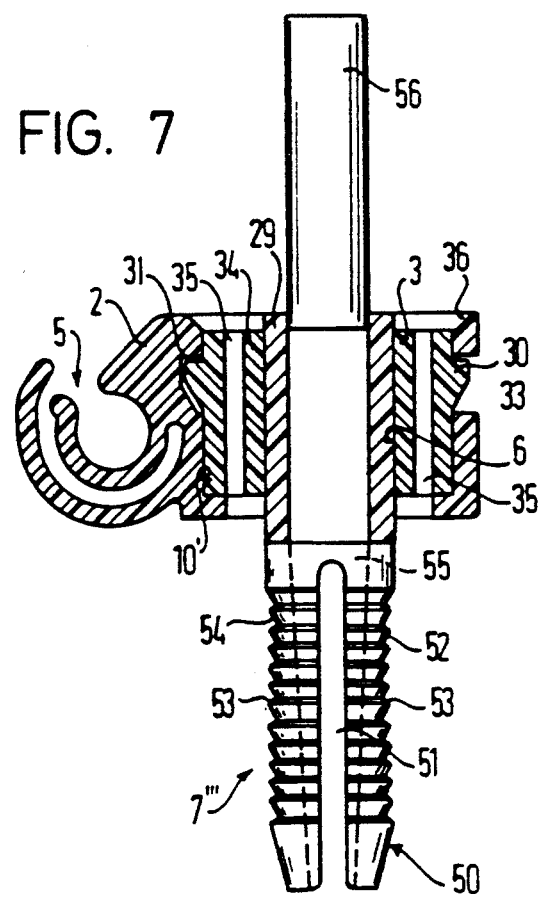

PLASTIC HOLDING ELEMENT

BACKGROUND OF THE INVENTION

This application is a continuation-in-part application of U.S. patent application Ser. No. 783,545, filed Oct. 25, 1991 for "Holding Element Made of Plastic" and now U.S. Pat. No. 5,170,984, issued Dec. 15, 1991.

The subject invention relates to a plastic holding element having a first part made of a hard material and including a storage zone for acceptance of at least one tube-shaped part with a second part made of a soft, attenuating material embedded in the first part and carrying a third part formed of hard material having a mounting or holding zone for joining the holding element to a support structure. This basic structure is shown in my prior U.S. Pat. No. 5,170,984, issued Dec. 15, 1992, for "Holding Element Made of Plastic".

With respect to the design of the holding zone of the third part, it was proposed in my above-mentioned prior patent to construct this portion as a receptacle aperture for receiving a profiled stud, or as a snap-in element or profiled bolt for placement in a support opening. The preferred embodiment as shown in the drawings, however, disclosed only a receptacle aperture for a profiled stud.

The present invention is concerned with the task of designing a holding element of the initially mentioned type such that an expanded application range results. The task is solved according to the invention in that the holding zone of the third part is designed as a peg-like element equipped with at least one profile portion embeddable in the aperture of a support. In this manner, it is possible to attach the entire holding element in a support aperture. Thus, there results an expansion of the application range of the holding element.

In accordance with a further refinement of the invention, insertion of the peg into a functionally secure position in a support aperture is facilitated by making the frontal side of the peg of cone shape. Axially behind the frontal cone-shaped portion of the peg may follow several holding lips, also constructed in the shape of a cone, which extend at least over a portion of the circumference of the peg-like element. These holding lips are arranged consecutively and place themselves against the circumference of the support aperture to thus provide firm seating of the holding element in the support aperture. If the thickness of the support is less than the length of the peg-like element, then the holding lips positioned in the anterior zone may grip beyond the support aperture and thereby effect additional locking on the opposite side of the support.

In another form of the invention, the holding lips may be constructed intermittently whereby the peg-like element may exhibit two smooth zones that face one another and interrupt the circumferential holding lips. In order to improve the positioning of the peg-like element within the support aperture, the element may carry at the side facing the first and second part at least two positioning ribs or thickened portions behind the last holding lip.

Alternatively, there also exists, with respect to a holding element of the initially mentioned type, the possibility to design the holding zone of the third part in the form of an arrow base. In such a design, the arrow base may, for example, exhibit two conically flared, resilient detent elements arranged in the anterior zone of a basic body facing one another and grabbing behind the aperture of the support. The basic body may pass over an attachment zone arranged in the interior of the second part.

Another possible embodiment for the holding element of the initially mentioned type comprises forming the holding zone of the third part in the form of a spreader rivet. The spreader rivet in such design may exhibit a longitudinal slot between oppositely facing holding zones that are equipped with graduations. A spreader peg which is embeddable in a conically tapering aperture acts to drive the holding zones radially outward. Furthermore, the spreader rivet may be connected with an attachment zone arranged in the interior of the second part.

For fastening of the peg, and/or the basic body, and/or the spreader rivet, the respective elements may be connected with an attachment zone arranged in the interior of the second part. The attachment zone may be designed to have a shape formed by a surface of revolution.

According to another feature of the invention, the attachment zone may be connected with the second part mechanically or by interengaging shoulders. Alternatively, the attachment zone can be connected with the second part by means of a known two-component extrusion process. This results in a simple design, inasmuch as during the manufacture there is already produced, Via the known two-component extrusion technology, a material bonding between the second and third part.

According to another feature of the invention, the exterior circumference of the second part may exhibit a circumferential flange which is embedded in a groove of the first part. The flange may comprise a cylindrical zone and a truncated cone-shaped zone facing the underside of the holding element. Moreover, the flange can be connected via several cross-pieces with a cylindrical zone which supports the attachment zone of the third part. In such an arrangement, there may be employed a total of four cross pieces for connecting the flange with the cylindrical zone.

BRIEF DESCRIPTION OF THE DRAWINGS

The above and other objects and advantages will become apparent the following description when read in conjunction with the accompanying drawings wherein:

FIG. 5 is a side elevational view of a second embodiment of a holding element formed in accordance with the invention;

FIG. 6 is a right end view of the holding element shown in FIG. 5; and,

FIG. 7 is a cross-sectional view like FIG. 4 showing a third embodiment of the invention.

DETAILED DESCRIPTION OF THE PREFERRED AND ALTERNATIVE EMBODIMENTS

Figure 1:
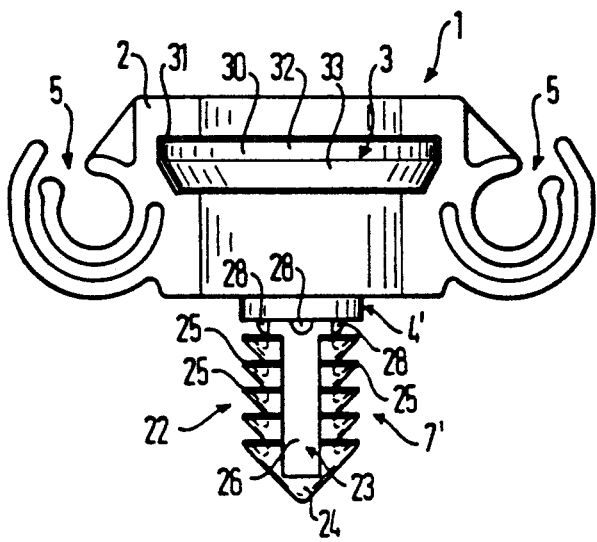
FIG. 1 is a side elevational view of a holding element formed in accordance with a first embodiment of the invention.
Figure 2:
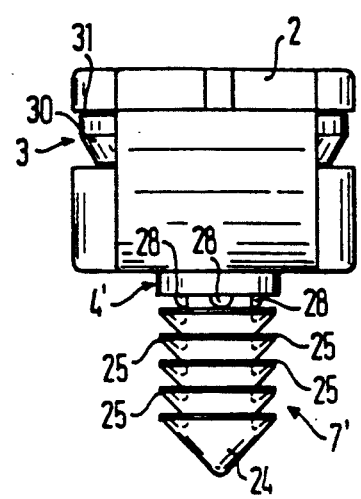
FIG. 2 is a right end view of the holding element shown in FIG. 1.

Referring more particularly to the drawings wherein the showings are for the purpose of illustrating preferred and alternate embodiments of the invention, and not for the purpose of limiting same, FIGS. 1 through 4 show a holding element 1 which is formed of plastic and generally comprises three parts. A first part 2 is made of a hard and relatively rigid plastic material and, in the illustrated embodiment, carries two storage zones 5 which are adapted to receive and hold tubular members such as fuel lines or the like. Received in the first part 2 is a second part 3 that is made of a soft, relatively resilient material. A third part 4' is supported in a second part 3 by being embedded therein via a through aperture 6. The third part 4' is formed from hard and comparatively rigid plastic material and provides a holding zone 7' that is located centrally between the two storage zones 5' of the first part 2. The holding zone 7' provides means for connecting the holding element 1 to associated structure, such as vehicle frame and body components.

It is evident from FIGS. 1 through 4 that the holding zone 7' of the third part 4' of the subject embodiment is designed as a rigid peg 23, equipped with at least one radially extending profile. The peg 23, equipped with profiles 22, is arranged to be embeddable in an aperture of a support structure not shown in more detail.

In order to permit the mounting of the holding element 1 in the aforementioned support aperture simply and rapidly, the frontal side 24 of peg 3 has a cone-shaped design. Adjacent to the cone-shaped frontal side 24' there are, in form of profiling 2, several cone-shaped holding lips 25. The holding lips 25 exhibit, according to FIG. 4, the shape of a dish with elastic zones, which position themselves against the inner circumference of a support aperture (which is not illustrated) thus producing a holding effect.

The flexible and resilient lips 25 extend at least over a portion of the outer circumference of the peg 23. It is apparent from FIGS. 1 and 3 that peg 23 exhibits two oppositely facing smooth zones 26 and 27 which interrupt the circumferential holding lips.

In order to perfectly center and position peg 23 within the support aperture, there may be provided, for example, four rigid positioning ribs or thickenings 28. The ribs 28 are distributed about the circumference and are arranged at the side facing the first part 2 and the second part 3, behind the last holding lip 25. These positioning ribs or thickenings 28 produce, in combination with the elastic exterior zones of holding lips 25, excellent, centered, and firm seating of holding element 1 within a support opening.

Figure 4:
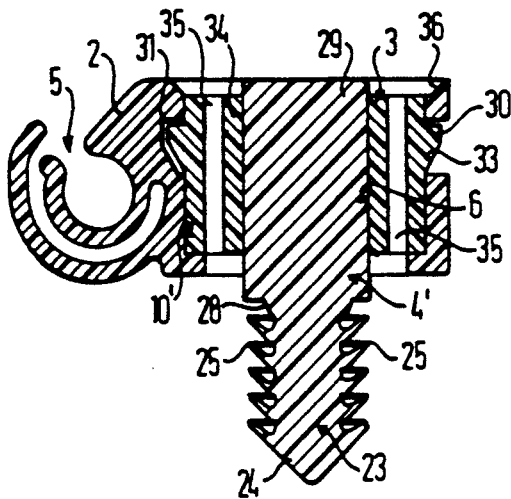
FIG. 4 is a cross-sectional view taken on line IV—IV of 3.

It is evident from FIG. 4 that peg 23 includes an attachment zone or portion 29 that is received in the interior of part 3. The attachment zone 29 may have an exterior surface of rotation, such as in the form of a full cylinder. The full cylinder fills aperture 6 of the second part 3.

For connection of attachment zone 29 with the second part 3, there may be provided mechanical connectors, interengaging shoulders, or the like. However, in the subject embodiment, according to FIG. 4 the attachment zone 29 is connected with the second part 3 by means of a known two-component extrusion process. Thus, parts 3 and 4, after manufacture through two-component extrusion technique, form a common unit via material bonding.

As can be seen from FIG. 4 the second part 3 carries at its exterior circumference a circumferential flange 30 which is embedded in a groove 31 of the second part 2. The groove 31, according to FIGS. 1 and 4, is shaped to conform to the shape of the first part. If, for instance, as in the present execution example, flange 3 consists of a cylindrical part 32 and a truncated cone-shaped part 33, then groove 31 of the first part 2 exhibits the Corresponding equivalent form. The flange 30 extends approximately up to the outer contour of the first part 2 as can be seen from FIG. 2.

Figure 3:
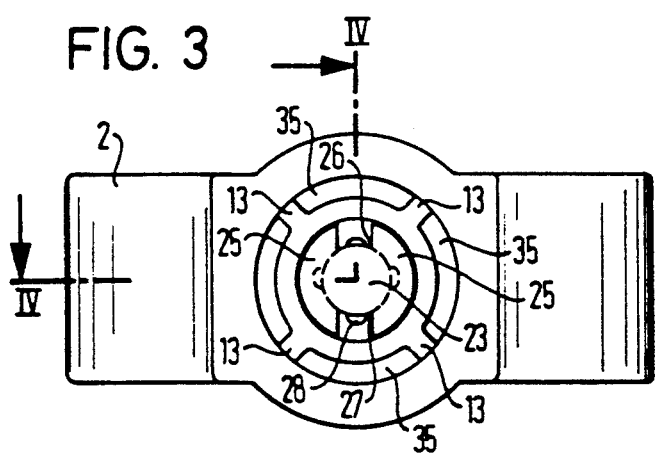
FIG. 3 is a bottom view of the holding element shown in FIG. 1.

It is apparent from FIGS. 3 and 4 that flange 30 is connected via several cross-pieces with a cylindrical zone or portion 34. In the present embodiment, four cross-pieces 13 are shown facing each other in diametrically opposed relationship. Between the adjacent cross-pieces 13 there is a respective open space 35.

Due to this constructive design, there exists the possibility to insert parts 3 and 4' into the first part 2' from above. A common unit is thus formed. Due to the spaces 35 and the truncated cone-shaped zone 33, the flange can radially retract elastically until it assumes, in the mounted state, the position according to FIG. 4. That is to say, it is received in groove 32.

In order to permit this installation, the upper zone of the first part 2 has a dish-shaped groove 36 which, together with parts 3 and 4', facilitates retraction of the circumferential flange 3 during the installation process. The part 2 also includes a recess 10, which accepts cylindrical zones of the second part 3 that extend above and below flange 3.

If, instead of holding lips 25, peg 23 of attachment zone 7' is equipped with a thread-like profiling (not shown in detail), then the upper part of attachment zone 29 may be furnished with a tool-receiving recess. Into the recess, a tool an be inserted, so that through rotation, the thread-shaped peg 23 can be turned into or out of a corresponding support aperture. Thus, holding element 1 may be detached from the support.

In the embodiment according to FIGS. 5 and 6, the holding zone 7" of the third part 4' is designed in the shape of an arrow-base 40. In this arrangement, the arrow-base 40 may carry two resilient, oppositely facing and conically tapering stop elements 41 and 42. As shown, the stop elements are carried at the outer end of the rigid body 43 which is part of the third part 4'. When inserted in a suitable sized support aperture, the resilient stop elements 41, 42 grip behind the support in a known manner. Alternatively, there also exists the possibility, which is not illustrated, to employ a resilient stop-foot and a rigid abutment element.

In the subject embodiment, the basic body 43 joins with an attachment zone 29 that is arranged in the interior of the second part 3 in a manner analogous to the form described according to FIG. 4. In this embodiment as well, the attachment zone 29 is connected with the second part 3 by means of a known two-component extrusion process. Thus, parts 3 and 4', after being produced by the two-component extrusion technique, again form a common unit via material bonding.

In addition, the basic body 43 may be equipped with oppositely disposed centering cross-pieces 44 and 45 which are adjusted to the diameter of the aperture, into which the holding zone 7" engages. By means of these centering cross-pieces on the one side of the support aperture and the stop-elements 41 and 42 gripping on the other side, excellent seating of the holding element according to the invention is guaranteed in the support aperture.

With this construction as well, the second part 3 carries a circumferential flange 3 that is embedded in a recess 31 of the second part 2. The flange 30, in turn, comprises a cylindrical part 32 and a truncated cone-shaped part 33.

FIG. 7 illustrates another embodiment of the holding element according to the invention. In this embodiment, holding zone 7″ of the third part 4 is designed as a spreader rivet 50. Spreader rivet 50 may exhibit at least one longitudinal slot 51, as well as opposing holding zones 52 and 54, equipped either with teeth-like graduations 53 or having no graduations.

Moreover, rivet 50 is provided with a spreader peg 56. The peg can be hammered into a central, conically tapering aperture 55 of the spreader rivet so that thereby the two holding zones 52 and 54 are spread apart and the graduations 53 can position themselves against the inner circumference of the aperture of a support.

The spreader rivet 50 is connected with an attachment zone 29, arranged in the interior of the second part 3. The attachment zone 29 is similar to the aforementioned embodiments and is connected with the second part 3 by means of the aforementioned, known two-component extrusion process. Again, the second part 3 carries a circumferential flange 30, which is embedded in a groove 31 of the second part 2.

As a result of the constructive design of the holding element according to the invention, there is produced an expanded application range with functionally secure attachment within the aperture of a support.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a plastic holding assembly with a mounting means for connecting the assembly to a support element and carrying at least one storage zone for mounting a tube-shaped part, the improvement wherein the assembly comprises a three-component construction with one first part of hard material carrying the storage zone, a second part placed therein and formed of soft, damping material with a third part formed of hard material vibration isolated from the first part by being placed in a transverse aperture in the second part, the transverse aperture defined by a collar assembly of soft damping material disposed between the one first part and the third part and preventing contact between the one first part and the third part, the third part carrying the mounting means for connecting the assembly to a support, the mounting means comprising a rigid peg equipped with a profiled exterior positionable into an aperture in the support element.

2. A holding assembly according to claim 1 wherein the peg terminates in a conical end portion.

3. A holding assembly according to claim 1 wherein the peg has a plurality of conically shaped, resilient holding lips.

4. A holding assembly as defined in claim 3 wherein the holding lips extend at least over a portion of the peg circumference.

5. A holding assembly according to claim 4 wherein the holding lips are circumferentially continuous.

6. A holding assembly according to claim 4 wherein the circumferential holding lips are interrupted by smooth zones.

7. A holding assembly according to claim 3 wherein the peg includes at least two positioning ribs distributed over the circumference for centering the peg in the aperture in the support element.

8. A holding assembly according to claim 1 wherein the peg includes an attachment zone arranged in the interior of the second part.

9. In a plastic holding assembly with a mounting means for connecting the assembly to a support element and carrying at least one storage zone for mounting a tube-shaped part, the improvement wherein the assembly comprises a three-component construction with one first part of hard material carrying the storage zone, a second part placed therein and formed of soft, damping material with a third part formed of hard material vibration isolated from the first part by being placed in a transverse aperture in the second part, the transverse aperture defined by a collar assembly of soft damping material disposed between the one first part and the third part and preventing contact between the one first part and the third part, the third part carrying the mounting means for connecting the assembly to a support, the mounting means comprising an arrow base.

10. A holding assembly according to claim 9 wherein the arrow base includes at least one stop element for extending through the aperture of a support, the stop element formed at the terminal end of an outwardly extending body of the third part.

11. A holding assembly according to claim 10 wherein the outwardly extending body joins to an attachment zone in the interior of the second part.

12. In a plastic holding assembly with a mounting means for connecting the assembly to a support element and carrying at last one storage zone for mounting a tube-shaped part, the improvement wherein the assembly comprises a three-component construction with one first part of hard material carrying the storage zone, a second part placed therein and formed of hard material vibration isolated from the first part by being placed in a transverse aperture in the second part, the transverse aperture defined by a collar assembly of soft damping material disposed between the one first part and the third part and preventing contact between the one first part and the third part, the third part carrying the mounting means for connecting the assembly to a support, the mounting means comprising a spreader rivet.

13. A holding assembly according to claim 12 wherein the spreader rivet includes at least one longitudinal slot and oppositely directed holding zones and a spreader peg positionable in a conically tapering aperture.

14. A holding assembly according to claim 13 wherein the spreader rivet is connected with an attachment zone arranged in the interior of the second part.

15. A holding assembly according to claim 14 wherein the attachment zone is a surface of revolution.

16. A holding assembly according to claim 15 wherein the attaching zone is connected with the second part via at least one stop device and counter-stop device.

17. A holding assembly according to claim 15 wherein the attachment zone is connected with the second part by being formed by two-component extrusion process.

18. A holding assembly according to claim 12 wherein the second part carries a circumferential flange which is positioned in a groove of the first part.

19. A holding assembly according to claim 18 wherein the circumferential flange comprises a cylindrical portion and a truncated cone-shaped zone.

20. A holding assembly according to claim 19 wherein the circumferential flange is connected by plural cross-pieces with a cylindrical zone which supports the attachment zone of the third part.

21. A holding assembly according to claim 20 wherein there are four cross-pieces.

* * * * *